(12) United States Patent
Tsurutani et al.

(10) Patent No.: US 6,425,645 B1
(45) Date of Patent: Jul. 30, 2002

(54) THRUST BALL BEARING

(75) Inventors: Kanetsugu Tsurutani; Chikara Katagiri, both of Mie (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 09/531,151

(22) Filed: Mar. 17, 2000

(30) Foreign Application Priority Data

Mar. 18, 1999 (JP) .............................. 11-074145

(51) Int. Cl.[7] .............................. F16C 19/10
(52) U.S. Cl. ...................................... 308/615
(58) Field of Search ................ 384/615, 621, 384/617, 255, 516

(56) References Cited

U.S. PATENT DOCUMENTS 5,813,843 A    9/1998  Suefuji et al.
6,149,412 A  * 11/2000  Kikuchi

FOREIGN PATENT DOCUMENTS

JP          10-89350         4/1998

OTHER PUBLICATIONS

Patent Abstracts of Japan, vol. 1998, NO. 04, Mar. 31, 1998 & JP 09 324816 A (NTN Corp.), Dec. 16, 1997, *Abstract*.
Patent Abstracts of Japan, vol. 130, No. 083 (M–802), Feb. 27, 1989 & JP 63 280882 A (Matsushita Electric Ind. Co., Ltd.), Nov. 17, 1988 *Abstract*.

* cited by examiner

*Primary Examiner*—Lenard A. Footland
(74) *Attorney, Agent, or Firm*—Wenderoth, Lind & Ponack, L.L.P.

(57) ABSTRACT

A thrust ball bearing includes a pair of races that make an eccentric revolving motion relative to each other. The races are formed with a plurality of opposed annular raceway grooves defined by an outer edge and an inner edge. Balls are received in the respective opposed pairs of raceway grooves. Each of the raceway grooves has a groove bottom pitch circle diameter that is smaller than the amount of offset. The height of the inner edge from the bottom of the groove is set at a predetermined value, and the height of the outer edge from the bottom of the groove is set to be larger than the height of the inner edge from the bottom of the groove. This arrangement prevents the contact ellipse of the ball from riding over the outer edge of the groove.

23 Claims, 5 Drawing Sheets

THRUST BALL BEARING

BACKGROUND OF THE INVENTION

This invention relates to a thrust ball bearing mounted between two members that make an eccentric revolving motion relative to each other, such as a stationary scroll and a revolving scroll of a scroll compressor.

A thrust ball bearing used in a scroll compressor is disclosed in Japanese patent publication 10-89350. As shown in FIGS. 4A and 4B, the thrust bearing comprises an opposed pair of annular races 1 and 2 having a plurality of opposed pairs of annular raceways 3 and 4 arranged at predetermined angular intervals, and balls 5 having a diameter dw (FIG. 4A) and each disposed between one of the pairs of raceways 3 and 4. The balls 5 are made of a bearing steel.

The race 1 is mounted to a frame 8 secured to a stationary scroll 7 and the race 2 is mounted to a revolving scroll 6.

The scrolls 6 and 7 have spiral partitioning walls 9 and 10, respectively, each received in the space defined by the walls 10 and 9 of the mating scroll. A compression chamber 11 is defined between each pair of the adjacent partitioning walls 9, 10.

The revolving scroll 6 is supported through a bearing on an eccentric rotary shaft 12 at its portion offset from its center of rotation by a distance $\underline{e}$ so that the scroll 6 revolves around the center of rotation of the shaft 12 without rotating about its own central axis. Each raceway 3, 4 has a groove bottom pitch circle diameter $\underline{d}$ that is set to be substantially equal to the amount of offset $\underline{e}$ to obtain a predetermined compression ratio in the compression chamber 11. The races 1, 2 are usually formed by pressing.

The thrust ball bearing bears a thrust load accompanying compression and also prevents the revolving scroll 6 from rotating about its own axis.

FIG. 5 is an enlarged view of the race 1. The annular raceway 3 comprises an annular groove 13 having an outer edge 14 and an inner edge 14', an outer shoulder 15 and a flat portion 17 formed outside the outer edge 14, and a central land 16 formed inside the inner edge 14'. The central land 16 comprises a top and an inner shoulder 18 disposed between the top and the inner edge 14'. The central land 16 is symmetrical in section with respect to its top, and its top is substantially at the same level as the flat portion 17. The outer and inner edges 14 and 14' are also at the same level $\underline{a}$ from the groove bottom.

The groove bottom pitch circle diameter $\underline{d}$ of a bearing of this type is usually set to be smaller than the ball diameter dw. For compactness and life of the bearing, the ratio dw/d should be as large as possible. The ball diameter dw is determined in view of durability of the balls. Thus, it is necessary to reduce the value $\underline{d}$ as much as possible while keeping the compression ratio at a predetermined value.

If the value $\underline{d}$ is reduced too much, the central land 16 would be too low in design and from a manufacturing viewpoint. If the central land 16 is too low, the contact ellipse A or contact impression might ride onto the shoulder 18 of the central land 16 as shown at B of FIG. 5. This increases surface pressure and shortens the life of the bearing.

The groove bottom pitch circle diameter $\underline{d}$ is set to a value as small as possible so long as it will not result in decrease in the life due to low accuracy in forming the groove. Based on the diameter $\underline{d}$ thus determined, the height $\underline{a}$ of the inner edge is then determined to a suitable value.

The contact ellipse is a contact impression having an elliptical shape and formed by contact of the ball 5 with the raceway 3, 4. For longer life of the bearing, the raceway 3 has to be designed such that the elliptical contact impression would not extend to or ride onto the shoulder 15 or 18.

One way to solve this problem while keeping the diameter $\underline{d}$ small is to set the diameter $\underline{d}$ smaller than the amount of offset $\underline{e}$. This would cause the ball 5 to roll near the outer shoulder 15 away from the inner shoulder 18.

But this solution has a drawback in that the elliptical contact impression might extend to or ride onto the outer shoulder 15 (as shown at C of FIG. 5). This also results in increased contact pressure and shortens the bearing life.

The same is true with the raceway 2.

An object of the invention is to provide a raceway design which prevents the elliptical impression from extending to the outer shoulder of the groove while keeping the diameter $\underline{d}$ smaller than the amount of offset $\underline{e}$.

SUMMARY OF THE INVENTION

According to the invention, there is provided a thrust ball bearing comprising a pair of races that make an eccentric revolving motion relative to each other, the races forward with a plurality of opposed pairs of annular raceways, balls each received in an opposed pair of the raceways, each of the raceways comprising a groove having a groove bottom pitch circle diameter that is smaller than the amount of offset of the eccentric revolving motion, the groove having an inner edge and an outer edge, the height of the inner edge from the bottom of the groove being set at a predetermined value, the height of the outer edge from the bottom of the groove being larger than the height of the inner edge from the bottom of the groove.

With this arrangement, since the height of the outer edge from the bottom of the groove is set to be larger than the height of the inner edge from the bottom of the groove, the tendency of the contact ellipse to move outwardly beyond the outer edge under load can be suppressed even though the ball tends to roll outside of the groove bottom pitch circle.

According to this invention, the height of the outer edge is set at such a value that the contact ellipse of the ball would not come out of the groove beyond the outer edge.

According to this invention, each of the raceways further comprises a central land formed inside the inner edge and having a top and an inner shoulder provided inside the inner edge and connecting the inner edge to the top, an outer shoulder provided outside the outer edge, and a flat surface provided outside the outer shoulder, the raceways each being symmetrical in section with respect to the central land, the flat surface being at a higher level than the top of the central land.

According to this invention, the inner and outer edges are inflection points between the groove and the inner shoulder and between the groove and the outer shoulder, respectively.

Other features and objects of the present invention will become apparent from the following description made with reference to the accompanying drawings, in which:

DETAILED DESCRIPTION OF THE PREFERRED EMBODIMENT

Figure 1A:
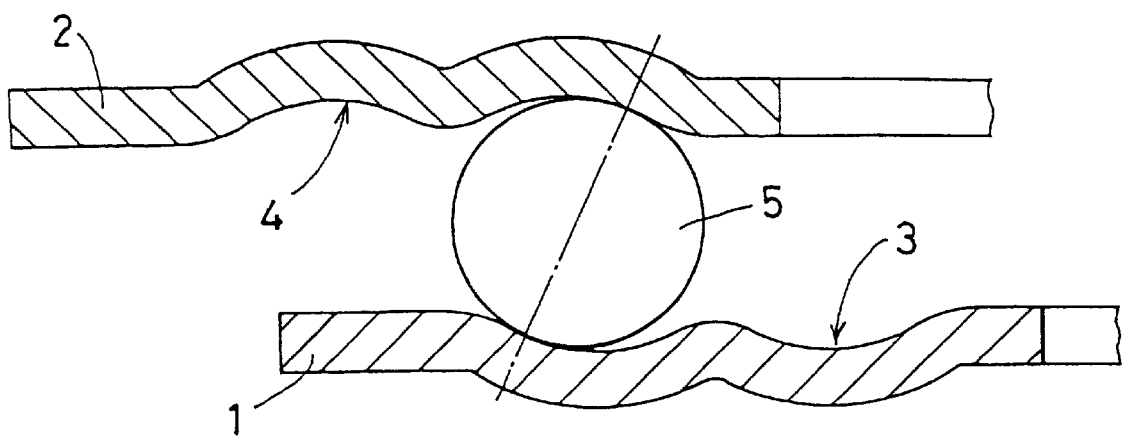
FIG. 1A is a partial enlarged sectional view of a thrust ball bearing embodying the invention.
Figure 1B:
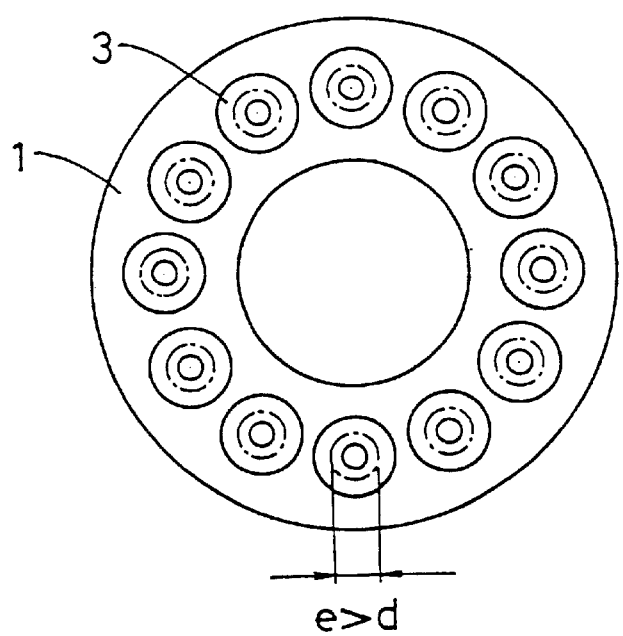
FIG. 1B is a plan view of the stationary race of the bearing of FIG. 1A.
Figure 2:
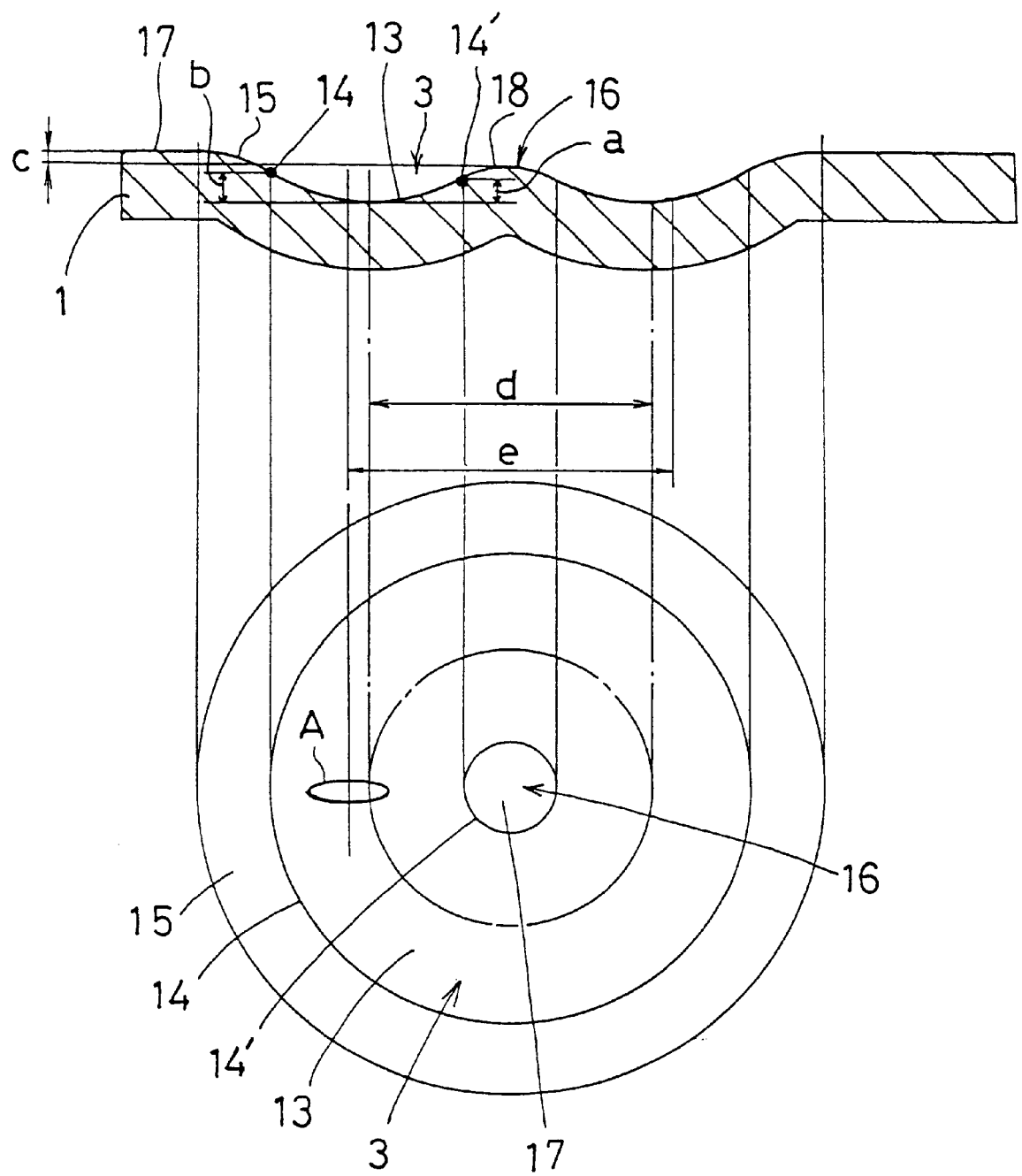
FIG. 2 is an enlarged partial view in section and plan of the stationary race of the bearing of FIG. 1A.

Now referring to FIGS. 1–3, the thrust ball bearing according to the invention comprises, like conventional ones, a pair of races 1, 2 formed with a plurality of opposed annular raceways 3, 4 arranged at predetermined angular intervals, and balls 5 each received between an opposed pair of raceways 3, 4.

Figure 4A:
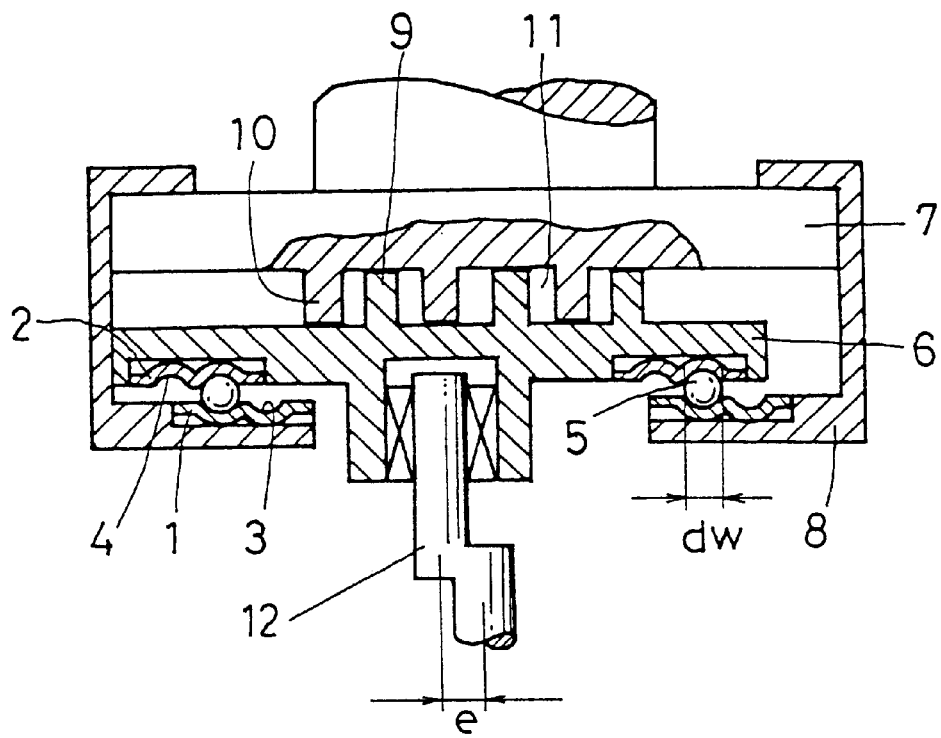
FIG. 4A is a sectional view of a scroll compressor having a thrust ball bearing.
Figure 4B:
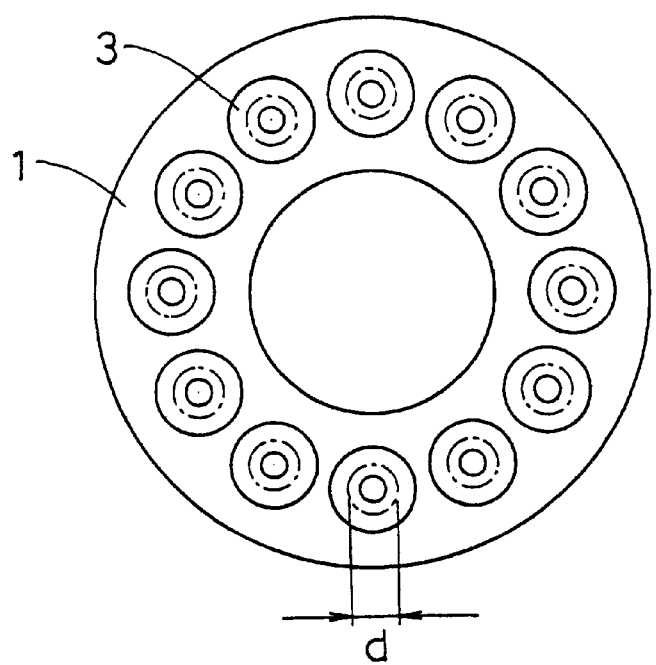
FIG. 4B is a plan view of the stationary race of the bearing of FIG. 4A.

Like conventional bearings, the thrust ball bearing of the present invention is used in a scroll compressor as shown in FIG. 4A. Thus, its race 2 is mounted to the revolving scroll and its race 1 to a component integral with the stationary scroll so that the race 2 revolves with an amount of offset $e$ relative to the race 1. Each raceway 3, 4 has a groove bottom pitch diameter $d$ which is smaller than the amount of offset $e$ (by e.g. 5% or less).

Figure 5:
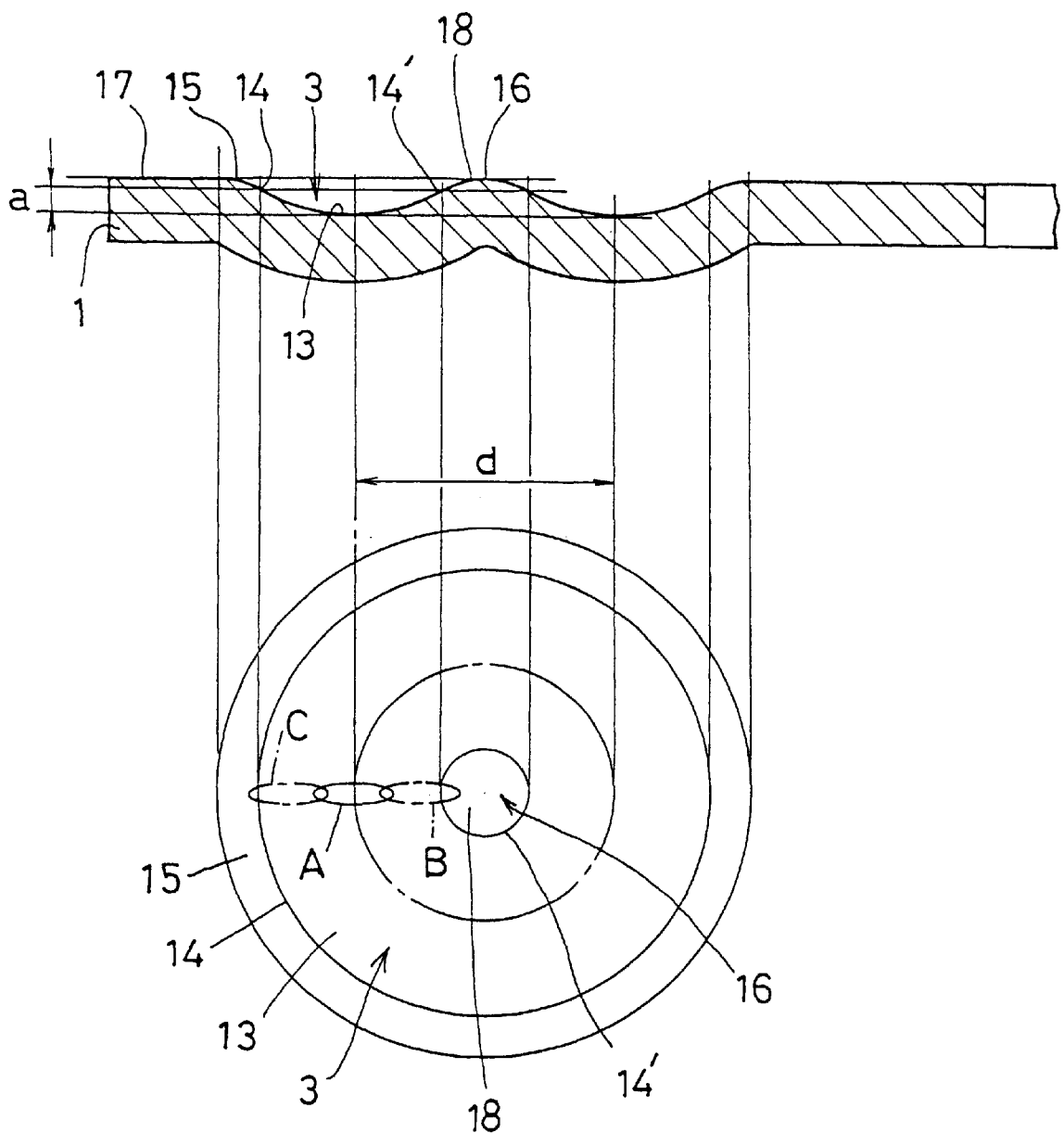
FIG. 5 is an enlarged partial view in section and plan of the stationary race of a conventional thrust ball bearing.

FIG. 2 is an enlarged section of a raceway 3 of the race 1. The raceway 3 has basically the same configuration as the raceway of FIG. 5, and the height $a$ of the inner edge 14' from the groove bottom and the height and shape of the central land 16 are the same as with the conventional raceway of FIG. 5. But the height $b$ of the outer edge 14 from the groove bottom is larger than the height $a$ and the height of the flat land 17 is higher by an amount $c$ than the height of the central land 16. The height $b$ from the groove bottom to the outer edge 14 is set to be larger than the height $a$ from the groove bottom to the inner edge 14', or in other words, at such a value that the contact ellipse A of the ball 5 would not move outwardly beyond the outer edge 14 of the groove 13.

The outer and inner edges 14 and 14' are on inflection points between the groove 13 and the outer shoulder 15 and between the groove 13 and the inner shoulder 18, respectively.

Figure 3A:
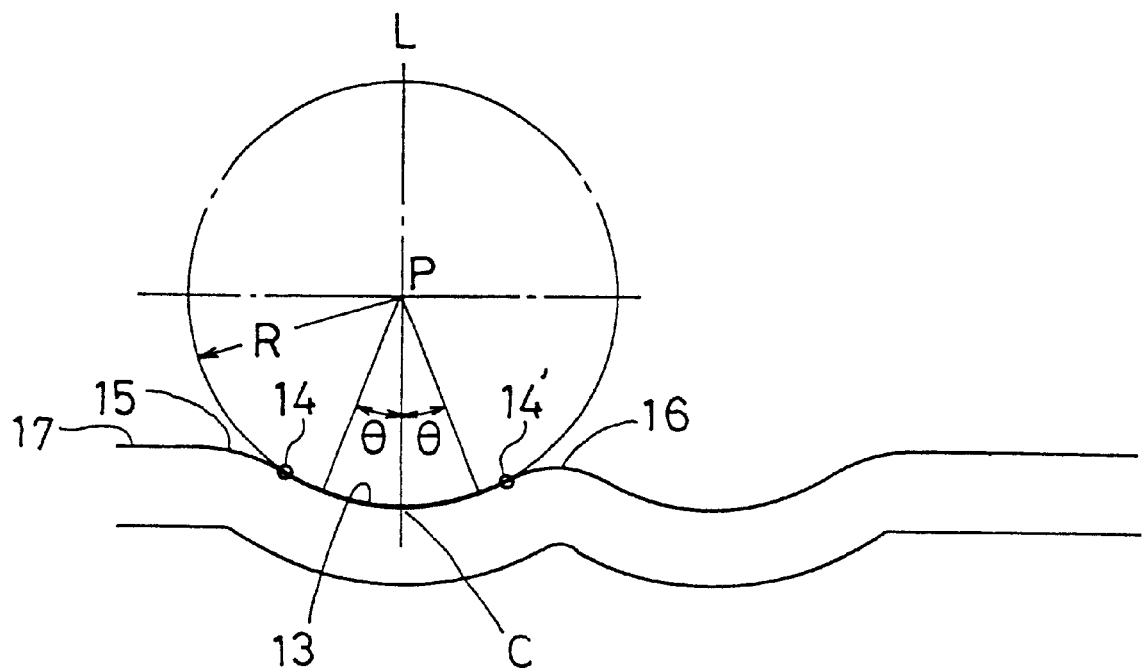
FIGS. 3A and 3B are schematic sectional views of the stationary race, showing different groove geometries.
Figure 3B:
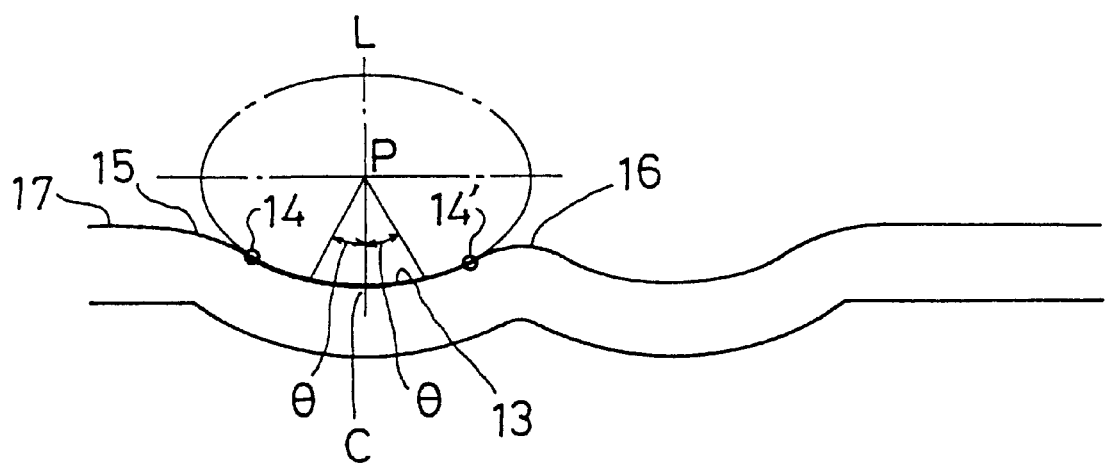

The groove 13 has such a shape as shown in FIG. 3A or FIG. 3B at a portion between the outer edge 14 and the inner edge 14'.

The shape shown in FIG. 3A is formed by a curve having a constant radius of curvature. In other words, each groove 13 has such a cross-sectional shape that the radii of curvature measured at any two points of the groove angularly spaced by the same angle θ in the opposite directions from the line L normal to the tangent of the deepest point C of the groove 13 are equal to each other. The radius of curvature is constant irrespective of the angle θ.

The groove of FIG. 3A is a part of a circle. The groove of FIG. 3B is a part of an ellipse arranged such that its minor axis is on the line L normal to the tangent of the deepest point C of the groove 13. In this arrangement, too, the radii of curvature measured at any two points of the groove angularly spaced by the same angle θ in the opposite directions from the line L normal to the tangent of the deepest point C of the groove are equal to each other. But the radius of curvature is not constant but varies with the angle θ.

The raceways 4 of the race 2 have the same structure as the raceways 3 of the race 1.

With this arrangement, although the ball 5 tends to roll under load outside of the groove bottom pitch circle because the amount of offset $e$ is larger than the groove bottom pitch circle diameter $a$, the contact ellipse A will not move out of the groove outwardly beyond the outer edge 14 because the height $b$ of the outer edge 14 from the groove bottom is large enough.

The races 1 and 2 are made from a steel plate and the raceways 3, 4 are formed by drawing. The raceway surfaces are surface hardened by through hardening, carburizing or induction hardening. The balls 5 are preferably made from stainless steel or a ceramic material to prevent brittle flaking.

As described above, if the groove bottom pitch circle diameter is set to be smaller than the amount of offset in the eccentric revolving motion to increase the life of the bearing, the contact ellipse of the ball might run outside of the groove. According to the present invention, this problem can be solved by setting the height of the groove outer edge from the groove bottom to be larger than the height of the inner edge from the groove bottom.

According to the present invention, reduction in size and longer life of a thrust ball bearing can be achieved.

Also, since the raceways formed with annular grooves which are difficult to machine are formed by drawing, cost reduction is possible. Further, because the races formed with raceways are surface hardened, higher resistance to wear can be achieved.

What is claimed is:

1. A thrust ball bearing comprising a pair of races that make an eccentric revolving motion relative to each other, said races formed with a plurality of opposed pairs of annular raceways, balls each received in an opposed pair of said raceways, each of said raceways comprising a groove having a groove bottom pitch circle diameter that is smaller than the amount of offset of said eccentric revolving motion, said groove having an inner edge and an outer edge, the height of said inner edge from the bottom of said groove being set at a predetermined value, the height of said outer edge from the bottom of said groove being larger than the height of said inner edge from the bottom of said groove.

2. The bearing as claimed in claim 1 wherein said height of said outer edge is set at such a value that the contact ellipse of the ball will not come out of the groove beyond said outer edge.

3. The bearing as claimed in claim 2 wherein said races are formed by drawing a stainless steel place and have their surfaces formed with said raceways hardened.

4. The bearing as claimed in claim 2 wherein each of said raceways further comprises a central land formed inside said inner edge and having a top and an inner shoulder provided inside said inner edge and connecting said inner edge to said top, an outer shoulder provided outside said outer edge, and a flat surface provided outside said outer shoulder, said raceways each being symmetrical in section with respect to said central land, said flat surface being at a higher level than said top of said central land.

5. The bearing as claimed in claim 2 wherein each of said grooves has such a cross-sectional shape that the radii of curvature measured at any two points of the groove angularly spaced by the same angle in the opposite directions from the line normal to the tangent of the deepest point of the groove are equal to each other.

6. The bearing as claimed in claim 2 wherein said balls are made of a stainless steel or a ceramic material.

7. The bearing as claimed in claim 1 wherein each of said raceways further comprises a central land formed inside said inner edge and having a top and an inner shoulder provided inside said inner edge and connecting said inner edge to said top, an outer shoulder provided outside said outer edge, and a flat surface provided outside said outer shoulder, said raceways each being symmetrical in section with respect to said central land, said flat surface being at a higher level than said top of said central land.

8. The bearing as claimed in claim 7 wherein said balls are made of a stainless steel or a ceramic material.

9. The bearing as claimed in claim 7 wherein each of said grooves has such a cross-sectional shape that the radii of curvature measured at any two points of the groove angularly spaced by the same angle in the opposite directions from the line normal to the tangent of the deepest point of the groove are equal to each other.

10. The bearing as claimed in claim 7 wherein said inner and outer edges are inflection points between said groove and said inner shoulder and between said groove and said outer shoulder, respectively.

11. The bearing as claimed in claim 10 wherein said races are formed by drawing a stainless steel plate and have their surfaces formed with said raceways hardened.

12. The bearing as claimed in claim 10 wherein said balls are made of a stainless steel or a ceramic material.

13. The bearing as claimed in claim 10 wherein each of said grooves has such a cross-sectional shape that the radii of curvature measured at any two points of the groove angularly spaced by the same angle in the opposite directions from the line normal to the tangent of the deepest point of the groove are equal to each other.

14. The bearing as claimed in claim 7 wherein said races are formed by drawing a stainless steel plate and have their surfaces formed with said raceways hardened.

15. The bearing as claimed in claims 1 wherein each of said grooves has such a cross-sectional shape that the radii of curvature measured at any two points of the groove angularly spaced by the same angle in the opposite directions from the line normal to the tangent of the deepest point of the groove are equal to each other.

16. The bearing as claimed in claim 15 wherein said groove has a cross-sectional shape which is a part of a circle or an ellipse.

17. The bearing as claimed in claim 16 wherein said races are formed by drawing a stainless steel plate and have their surfaces formed with said raceways hardened.

18. The bearing as claimed in claim 16 wherein said balls are made of a stainless steel or a ceramic material.

19. The bearing as claimed in claim 15 wherein said races are formed by drawing a stainless steel plate and have their surfaces formed with said raceways hardened.

20. The bearing as claimed in claim 15 wherein said balls are made of a stainless steel or a ceramic material.

21. The bearing as claimed in claim 1 wherein said races are formed by drawing a stainless steel plate and have their surfaces formed with said raceways hardened.

22. The bearing as claimed in claim 21 wherein said balls are made of a stainless steel or a ceramic material.

23. The bearing as claimed in claim 1 wherein said balls are made of a stainless steel or a ceramic material.

* * * * *